Aug. 6, 1963

G. J. BRYAN 3,099,960

METHOD OF THRUST VECTOR CONTROL

Filed Aug. 19, 1960

INVENTOR.
GEORGE J. BRYAN

BY W. O. Quesenberry
O. C. Hodges

ATTORNEYS.

United States Patent Office 3,099,960
Patented Aug. 6, 1963

3,099,960
METHOD OF THRUST VECTOR CONTROL
George J. Bryan, Cocoa Beach, Fla., assignor to the United States of America as represented by the Secretary of the Navy
Filed Aug. 19, 1960, Ser. No. 50,809
5 Claims. (Cl. 102—50)
(Granted under Title 35, U.S. Code (1952), sec. 266)

The invention described herein may be manufactured and used by or for the Government of the United States of America for governmental purposes without the payment of any royalties thereon or therefor.

This invention relates to a reaction power control for a missile and has particular relation to means whereby jet powered missiles utilizing the reaction type of motor may be steered and otherwise controlled by varying the orifice of the control nozzles.

In the jet-propelled missiles, the jet is arranged to exert thrust in a forward direction, and, as the air speed may be quite high, above the speed of sound, for example, the effort required to move rudders, elevators and ailerons, which increases as the speed increases, may become too great for remote operation. Such aerodynamic devices provide no control outside the earth's atmosphere. Therefore, in accordance with the present invention, a plurality of variable normally closed auxiliary nozzles are disposed on the outer periphery of the main nozzles and are arranged to give a variable thrust vector control in yaw, pitch and roll.

The prior art in attempting to solve this problem has utilized such devices as jetevators and jet spoilers. In order to obtain sufficient control of the rocket the jetevators must be placed in the main portion of the jet stream. In order to use a jetevator, the main nozzle must be designed so that the jet stream does not separate into dead regions within the nozzle. In a rocket design for underwater launching the jetevator is at a particular disadvantage because the design does not permit the use of a nozzle of optimum efficiency and because of the additional weight of the jetevator assembly.

In addition, sealing of the jetevator against blowback gas is essential for reliable efficient operation.

As the operation of applicant's invention is more fully understood by the following description it will become apparent that applicant has made a substantial improvement in the art.

It is therefore an object of this invention to provide a new and improved means for deflecting and controlling a reaction jet issuing from a nozzle in a non-axial direction, away from the main jet stream thus altering the axial component of the thrust for steering and controlling the rocket.

A further object is to provide new and improved means for deflecting a reaction jet issuing from a nozzle in any one of several directions with reference to the axes of the main nozzles.

Still another object is to provide a plurality of normally closed control nozzles on the peripheries of said main nozzles and the orifice of each of the control nozzles may be selectively varied from the normally closed position.

Other objects and many attendant advantages of this invention will be readily appreciated as the same becomes better understood by reference to the following detailed description when considered in connection with the accompanying drawings in which like reference numerals designate like parts throughout the several figures thereof, and wherein.

Figure 1:
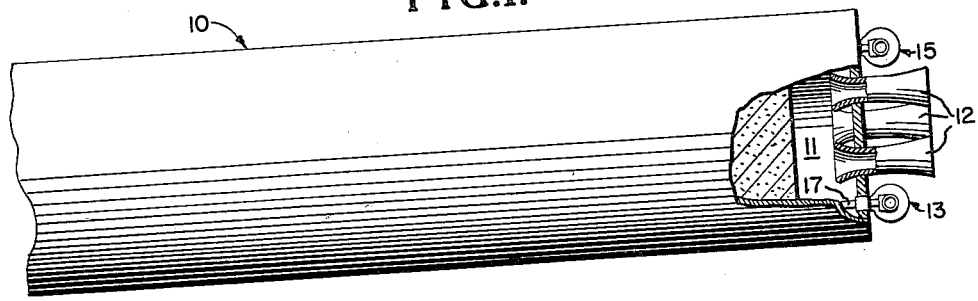
FIG. 1 is a side elevation of a type of missile adapted to receive the improved control mechanism.
Figure 2:
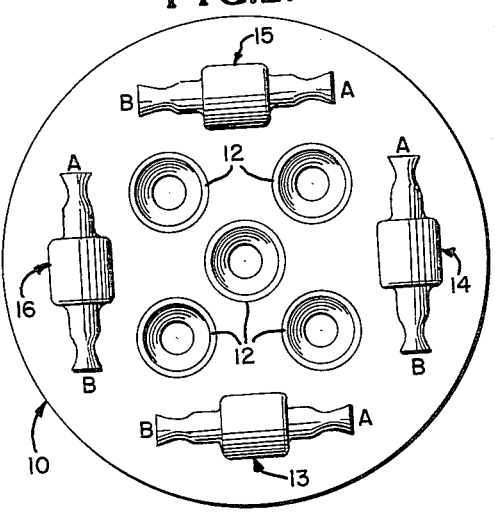
FIG. 2 is an enlarged rear elevation of the missile shown in FIG. 1 with the control nozzles.

Referring now to the drawings wherein in FIG. 1 a missile 10 is provided with a combustion chamber 11 and a plurality of main discharge nozzles 12. FIG. 2 discloses the control devices 13, 14, 15 and 16 which are normally closed and under constant pressure by reason of access pipe 17 which opens into the main combustion chamber 11. The control devices are located around the periphery of the main nozzles 12 and are placed equidistant from adjacent devices at an angle of 90°.

Figure 3:
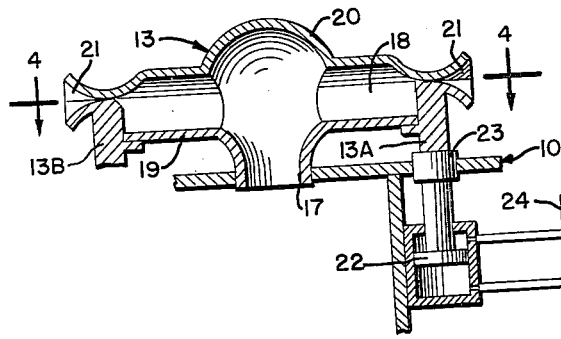
FIG. 3 is an enlarged sectional view of a pair of normally closed control nozzles.

FIG. 3 is a sectional view of one of the control devices wherein the gas enters the control chamber 18 through base member 19 and impinges upon top member 20. The control pressure chamber has two variable control plungers 13A and 13B which slide in bearing 23 and vary the venturi nozzle 21. Each venturi nozzle has a fixed semi-circular section and a complementary movable semi-circular section. The control plungers are operated by hydraulic control valves in control unit 24 which cause piston 22 to move up and down by controlling the hydraulic pressure source 27.

Figure 4:
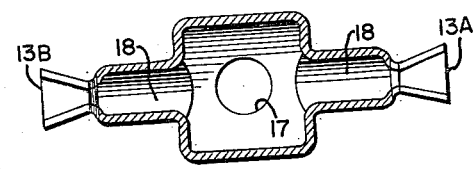
FIG. 4 is a sectional view of FIG. 3 taken along line 4—4; disclosing the stationary side portions and the adjustable end portions of a pair of nozzles.
Figure 5:
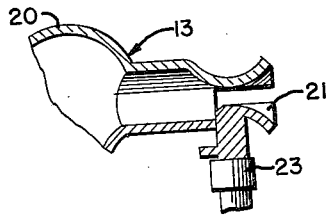
FIG. 5 is a view of FIG. 3 partially broken away with the nozzle partially open.

FIG. 4 discloses the stationary side members of the control device 13 with variable control plungers 13A and 13B in the exhaust orifices of the control chamber.

The controls operate as follows:

If it is desired to deflect the jet from a horizontal flight to a vertical downward flight, the valves of control plungers 14B and 16B are opened, all other valves remaining closed. An auxiliary jet will issue from control nozzles 14B and 16B at a right angle to the main jets giving a resultant force at an oblique angle thereby turning the missile in a downward direction. The control jets are designed to utilize from 5% to 20% of the available jet thrust for control and a minimum of zero percent at minimum control.

If the missile starts to spin or roll it may be realigned within its trajectory by opening a single control plunger thereby producing a counter turning moment about the axial center. To aid in the generation of concurrent side forces, it is necessary to open two nozzles such as 14A and 16B in FIG. 2.

By selectively controlling the opening of each of the control nozzles the missile may be steered and controlled in flight as desired.

It is considered obvious to a person skilled in the art that the control jets may be located at other angles than 90° with respect to the main jet stream, for example, 45° and still obtain a satisfactory degree of steering and control.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A missile having a motor section and a control device, said motor section providing the propulsive force to the missile by exhausting high pressure gas through a propulsive nozzle located on one end of said motor section, said control device including a plurality of housing members mounted equi-angularly on the exterior periphery of said one end of said motor section, a pair of normally closed oppositely disposed adjustable venturi nozzles in each of said plurality of housing members, each venturi nozzle having a fixed semi-circular section and a complementary movable semi-circular section, a chamber located in each of said plurality of housing members for interconnecting said pair of adjustable venturi nozzles, connector means for connecting said chamber with the high pressure gas in said motor section, control means for individually controlling the complementary movable semi-circular sections of the adjustable nozzles that vent a portion of the high pressure gas thereby changing the angle of the resultant propulsive force to control the missile in flight.

2. The missile of claim 1 wherein the control means is a fluid motor, control valve and a source of pressure in connection with and utilized to control the movable sections of said nozzles.

3. The missile of claim 1 wherein the adjustable venturi nozzles may be adjusted to vent up to 20% of the propulsive force.

4. The missile of claim 1 wherein the high pressure gas vented by the adjustable venturi nozzle is in a plane normal to the propulsive force of the motor.

5. In a missile comprising a motor section for generating a propulsive force to the missile, means for controlling the missile, at least one propulsive nozzle located at one end of the motor section for exhausting the propulsive force generated by said motor section, said means for controlling the missile including at least four control units mounted on the outer periphery of said one end of the motor section in a circular configuration having the propulsive nozzle at the center, each control unit being equidistant from the adjacent control unit, a pair of normally closed oppositely disposed adjustable venturi nozzles having a common connecting chamber in each control unit, each venturi nozzle having a fixed semi-circular section and a complementary movable semi-circular section, a connecting passageway in each control unit for providing the common connecting chamber with the propulsive force of said motor, a control means for individually controlling each adjustable venturi nozzle, said control means being connected to each of said complementary movable semi-circular sections, each adjustable venturi nozzle when opened venting a portion of the propulsive force in a plane normal to the propulsive force of the propulsive nozzle whereby the angle of the resultant force may be varied to control the missile in flight.

References Cited in the file of this patent

UNITED STATES PATENTS

| 2,850,976 | Seifert | Sept. 9, 1958 |
| 2,974,594 | Boehm | Mar. 14, 1961 |

FOREIGN PATENTS

| 879,835 | France | Dec. 10, 1942 |